(12) United States Patent
Schoen et al.

(10) Patent No.: US 6,692,561 B1
(45) Date of Patent: Feb. 17, 2004

(54) INTENSELY COLORED INTERFERENCE PIGMENTS

(75) Inventors: Sabine Schoen, Darmstadt (DE); Klaus Bernhardt, Gross-Umstadt (DE); Christoph Schmidt, Kriftel (DE)

(73) Assignee: Merck Patent Gesellschaft mit beschränkter Haftung, Darmstadt (DE)

(*) Notice: Subject to any disclaimer, the term of this patent is extended or adjusted under 35 U.S.C. 154(b) by 0 days.

(21) Appl. No.: 10/111,772

(22) PCT Filed: Oct. 25, 2000

(86) PCT No.: PCT/EP00/10507

§ 371 (c)(1), (2), (4) Date: Sep. 5, 2002

(87) PCT Pub. No.: WO01/30920

PCT Pub. Date: May 3, 2001

(30) Foreign Application Priority Data

Oct. 28, 1999 (DE) ......................... 199 51 869

(51) Int. Cl.[7] ................................ C09C 1/36
(52) U.S. Cl. ............... 106/439; 106/417; 106/418; 106/430; 106/436; 106/439; 106/456
(58) Field of Search ............... 106/415, 417, 106/439

(56) References Cited

U.S. PATENT DOCUMENTS

| | | | | | |
|---|---|---|---|---|---|
| 5,009,711 | A | * | 4/1991 | Emmert et al. | 106/415 |
| 6,579,355 | B1 | * | 6/2003 | Schmidt et al. | 106/415 |
| 6,599,355 | B1 | * | 7/2003 | Schmidt et al. | 106/417 |

FOREIGN PATENT DOCUMENTS

| | | |
|---|---|---|
| EP | 0211351 | 2/1987 |
| EP | 0708154 | 4/1996 |
| EP | 0753545 | 1/1997 |
| WO | 9413489 | 6/1994 |
| WO | 0043456 | 7/2000 |

* cited by examiner

Primary Examiner—C. Melissa Koslow
Assistant Examiner—Shalie Manlove
(74) Attorney, Agent, or Firm—Millen, White, Zelano & Branigan, P.C.

(57) ABSTRACT

The invention relates to intensely colored interference pigments based on multi-layered plate-like substrates with at least two sequences of layers consisting of (A) a colorless layer with a refraction index $n \leq 1,8$; (B) a high-index layer consisting of a mixture of $TiO_2$ and $Fe_2O_3$ in a ratio of 1:0.1 to 1:5 and optionally, one or more metal oxides in quantities of to layer (B); and optionally (C) an outer protective layer.

20 Claims, No Drawings

INTENSELY COLORED INTERFERENCE PIGMENTS

The present invention relates to intensely coloured interference pigments based on multicoated platelet-shaped substrates.

Lustre or effect pigments are employed in many areas of industry, in particular in the area of automotive paints, decorative coating, in plastic, in surface coatings, printing inks and in cosmetic formulations.

Owing to their colour play, lustre pigments which exhibit an angle-dependent colour change between a number of interference colours are of particular interest for automotive paints and in counterfeiting-proof securities. Pigments of this type based on multicoated platelet-shaped substrates are disclosed in U.S. Pat. No. 4,434,010, JP H7-759, U.S. Pat. No. 3,438,796, U.S. Pat. No. 5,135,812, DE 44 05 494, DE 44 37 753, DE 195 16 181 and DE 195 15 988.

Lustre pigments based on transparent platelet-shaped substrates which do not have a "hard" metallic lustre are the subject-matter of WO 93/12182. Mica platelets are covered with a high-refractive-index metal-oxide layer, such as, for example, $TiO_2$, and a non-selectively absorbing layer. Depending on the $TiO_2$ layer thickness, these pigments exhibit a certain interference colour when viewed perpendicularly which becomes weaker and weaker with increasingly oblique viewing angle and finally drops off to grey or black. The interference colour does not change, but a decrease in colour saturation is observed.

JP 1992/93206 claims lustre pigments based on glass flakes or mica particles which are covered with an opaque metal layer and alternating $SiO_2$ and $TiO_2$ layers.

EP 0 753 545 A2 discloses goniochromatic lustre pigments based on multi-coated, high-refractive-index, non-metallic, platelet-shaped substrates which are at least partially transparent to visible light, which pigments have at least one layer pack comprising a colourless, low-refractive-index coating and a reflective coating which absorbs selectively or non-selectively. The preparation process described in EP 0 753 545 A2 involves coating the pigment substrate by CVD (chemical vapour deposition) in a fluidised-bed reactor ("fluidised bed process"). Here, the substrate, for example finely divided mica, is fluidised in a stream of an inert carrier gas and kept in motion. The reagents necessary for the formation of the oxide layers are supplied via the stream of inert gas or further inert-gas inlets. However, owing to the high density difference between the mica/pigment and the carrier gas, a significant problem in this process is uniform distribution of the solid particles and thus uniform coating. Accordingly, disadvantages of this invention are the technically very complex and expensive preparation process and the often difficult reproducibility of the pigments in the desired product quality.

Goniochromatic lustre pigments having a silicon-containing coating based on multicoated platelet-shaped metallic substrates are disclosed in EP 0 768 343 A2.

A common feature of the multilayered pigments known from the prior art is that they have inadequate tinting strength and comparatively low hiding power. Furthermore, the pigments are in some cases very difficult to prepare or reproduce.

The object of the present invention is to provide gold- and orange-red interference pigments having high tinting strength and high hiding power which are distinguished by their advantageous applicational properties and at the same time can be prepared in a simple manner.

Surprisingly, gold- and orange-red pigments based on multicoated platelet-shaped substrates which have a certain arrangement of optically functional layers, giving particular optical effects, have now been found.

The intensely coloured interference pigments according to the invention are distinguished by their extraordinarily high chroma C ("tinting strength"), their very high hiding power and very strong lustre with glitter effect. In contrast to gold-coloured pearlescent pigments as disclosed, for example, in EP 0 211 351 B1, the gold-coloured interference pigments according to the invention exhibit significantly higher tinting strength and higher hiding power. The gold pigments according to the invention are an equivalent—and with respect to lustre and tinting strength—superior alternative to the known metal bronzes, in particular in gravure printing on textiles.

In contrast to the goniochromatic pigments, the pigments according to the invention have only a slight angle-dependent colour effect, or none at all.

The invention thus relates to intensely coloured interference pigments based on multicoated platelet-shaped substrates which comprise at least two layer sequences comprising (A) a colourless coating having a refractive index n of $\leq 1.8$, (B) a high-refractive-index coating consisting of a mixture of $TiO_2$ and $Fe_2O_3$ in a ratio of from 1:0.1 to 1:5, and optionally one or more metal oxides in amounts of $\leq 20\%$ by weight, based on layer (B), and optionally (C) an outer protective layer.

The invention furthermore relates to the use of the pigments according to the invention in paints, coatings, plastics, printing inks, security printing inks, ceramic materials, glasses and cosmetic formulations and in particular in printing inks. The pigments according to the invention are furthermore also suitable for the preparation of pigment preparations and for the preparation of dry preparations, such as, for example, granules, chips, pellets, briquettes, etc. The dry preparations are particularly suitable for printing inks.

Suitable base substrates for the multilayered pigments according to the invention are on the one hand opaque platelet-shaped substrates and on the other hand transparent platelet-shaped substrates. Preferred substrates are phyllosilicates and metal oxide-coated platelet-shaped materials. Particularly suitable substrates are natural and/or synthetic mica, talc, kaolin, platelet-shaped iron oxides or aluminium oxides, glass flakes, $SiO_2$ flakes, $TiO_2$ flakes or synthetic ceramic flakes, synthetic support-free platelets, liquid crystal polymers (LCPs), holographic pigments, BiOCl, metal platelets, such as, for example, aluminium platelets, platelets of aluminium bronzes, brass bronzes, zinc bronzes, titanium bronzes, or of other comparable materials.

The size of the base substrates is not crucial per se and can be matched to the respective application. In general, the platelet-shaped substrates have a thickness of between 0.05 and 5 $\mu$m, in particular between 0.1 and 4.5 $\mu$m. The extension in the two other ranges is usually between 1 and 250 $\mu$m, preferably between 2 and 200 $\mu$m, and in particular between 5 and 60 $\mu$m.

The thickness of the individual layers of high (for example pseudobrookite) and low refractive index on the base substrate is essential for the optical properties of the pigment. For a pigment having intense interference colours, the thickness of the individual layers must be set precisely with respect to one another.

If n is the refractive index of a thin layer and d is its thickness, the interference colour of this layer is determined by the product n·d (n·d=optical thickness).

The colours arising in a film of this type in reflected light in the case of perpendicular light incidence arise from an amplification of the light having the wavelength $$\lambda = \frac{4}{2N-1} \cdot n \cdot d$$

and by attenuation of the light having the wavelength $$\lambda = \frac{2}{N} \cdot n \cdot d$$

where N is a positive integer.

The variation in the colour resulting in the case of increasing film thickness arises from the amplification or attenuation of certain wavelengths of the light by interference. If a plurality of layers in a multilayered pigment have the same optical thickness, the colour of the reflected light becomes more intense with increasing number of layers. Given a suitable choice of the layer thicknesses, however, it is also possible to obtain very attractive interference pigments with layers of different optical thickness. The thickness of the individual metal-oxide layers, independently of their refractive index, is generally from 10 to 1000 nm, preferably from 15 to 800 nm, and in particular 20–600 nm, depending on the area of application.

Colourless, low-refractive-index materials which are suitable for the coating (A) are preferably metal oxides or the corresponding oxide hydrates, such as, for example, $SiO_2$, $Al_2O_3$, $AlO(OH)$, $B_2O_3$, $MgF_2$, $MgSiO_3$ or a mixture of the said metal oxides. The thickness of layer (A) is 10–1000 nm, preferably 20–800 nm and in particular 30–600 nm. The coating of the substrate with a relatively thin, low-refractive-index layer increases the mechanical stability and gives a smooth substrate surface (few unevennesses, few pores).

The interference pigments according to the invention have, in an alternating manner, a high-refractive-index coating (B) consisting of a mixture of $TiO_2$ and $FeO_3$, preferably pseudobrookite, in combination with a colourless low-refractive-index coating (A). The pigments may comprise a plurality of identical or different combinations of layer packs, but the substrate is preferably covered by two layer packs (A)+(B) and optionally (C). In order to intensify the tinting strength, the pigment according to the invention may comprise up to 4 layer packs, although the thickness of all layers on the substrate should not exceed 3 μm. An even number of layers is preferably applied to the platelet-shaped substrate. Particular preference is given to a structure of four optical interference layers in the sequence (A) (B) (A) (B) and optionally (C).

The high-refractive-index layer (B) preferably has a refractive index of $n \geq 1.8$, in particular of $n \geq 2.0$, and is a mixture of $TiO_2$ and $Fe_2O_3$, where the mixing ratio is from 1:0.1 to 1:5, in particular from 1:1 to 1:2.5. Layer (B) is preferably intensely coloured pseudobrookite. The thickness of layer (B) is 10–550 nm, preferably 15–400 nm and in particular 20–350 nm.

In order to increase the tinting strength of layer (B), it is frequently advisable to admix one or more metal oxides, such as, for example, $Al_2O_3$, $Ce_2O_3$, $B_2O_3$, $ZrO_2$ or $SnO_2$, with the $TiO_2/Fe_2O_3$ mixture. The proportion of the further metal oxides in % by weight in addition to the $Fe_2O_3/TiO_2$ mixture in layer (B) should be not more than 20% by weight, preferably not more than 10% by weight.

The multicoating of the substrates with a low-refractive-index layer (A) and a high-refractive-index layer (B) results in the formation of interference pigments whose colour, lustre and hiding power can be varied within broad limits.

The pigments according to the invention can easily be prepared by the production of a plurality of high- and low-refractive-index interference layers with precisely defined thickness and a smooth surface on the finely divided, platelet-shaped substrates.

The metal-oxide layers are preferably applied by wet-chemical methods, it being possible to use the wet-chemical coating methods developed for the production of pearlescent pigments. Methods of this type are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or in further patent documents and other publications.

In the case of wet coating, the substrate particles are suspended in water, and one or more hydrolysable metal salts are added at a pH which is suitable for hydrolysis, this pH being selected in such a way that the metal oxides or metal oxide hydrates are precipitated directly onto the platelets without secondary precipitations occurring. The pH is usually kept constant by simultaneous metering-in of a base and/or acid. The pigments are subsequently separated off, washed and dried and optionally ignited, it being possible for the ignition temperature to be optimised with respect to the coating present in each case. In general, the ignition temperatures are between 250 and 1000° C., preferably between 350 and 900° C. If desired, the pigments can be separated off, dried and optionally ignited after application of individual coatings and then re-suspended again for precipitation of the further layers.

The coating can furthermore also be carried out in a fluidised-bed reactor by gas-phase coating, it being possible, for example, correspondingly to use the processes proposed in EP 0 045 851 and EP 0 106 235 for the production of pearlescent pigments. The hue of the pigments can be varied within broad limits by selecting different covering amounts or layer thicknesses resulting therefrom. The fine tuning for a certain hue can be achieved beyond the pure choice of amount by approaching the desired colour under visual or measurement technology control.

In order to increase the light, water and weather stability, it is frequently advisable, depending on the area of application, to subject the finished pigment to post-coating or post-treatment. Suitable post-coatings or post-treatments are, for example, the processes described in German Patent 22 15 191, DE-A 31 51 354, DE-A 32 35 017 or DE-A 33 34 598. This post-coating (layer C) further increases the chemical stability or simplifies handling of the pigment, in particular incorporation into various media.

The pigments according to the invention are compatible with a large number of colour systems, preferably from the area of paints, coatings and printing inks. For the production of printing inks, a large number of binders, in particular water-soluble grades, is suitable, as marketed, for example, by BASF, Marabu, Pröll, Sericol, Hartmann, Gebr. Schmidt, Sicpa, Aarberg, Siegberg, GSB-Wahl, Follmann, Ruco or Coates Screen INKS GmbH. The printing inks may be water-based or solvent-based. The pigments are furthermore also suitable for the laser marking of paper and plastics, and for applications in the agricultural sector, for example for greenhouse sheeting, and, for example, for the colouring of tent awnings.

The invention thus also relates to the use of the pigments in formulations such as paints, printing inks, surface coatings, plastics, ceramic materials, glasses and in cosmetic formulations, and also as dopant in the laser marking of paper and plastics.

It goes without saying that, for the various applications, the multilayered pigments can also advantageously be used in the form of a mixture with organic dyes, organic pigments or other pigments, such as, for example, transparent white, coloured and black pigments having high hiding power, and with platelet-shaped iron oxides, organic pigments, holographic pigments, LCPs (liquid crystal polymers) and conventional transparent, coloured and black lustre pigments based on metal oxide-coated mica and $SiO_2$ platelets, etc. The multilayered pigments can be mixed with commercially available pigments and fillers in any ratio.

The pigments according to the invention are furthermore suitable for the production of flowable pigment preparations and dry preparations, in particular for printing inks, consisting of the pigment according to the invention, binders and optionally one or more additives.

The following examples are intended to explain the invention in greater detail, but without restricting it.

EXAMPLES

Example 1

100 g of mica having a particle size of 10–60 µm are heated to 75° C. in 2 l of demineralised water. When this temperature has been reached, the pH of the suspension is raised to pH 7.5 by means of 32% sodium hydroxide solution, and 163 g of sodium water-glass solution (13.5% of $SiO_2$) is metered in with vigorous stirring. During this, the pH is kept constant by means of 10% hydrochloric acid. The pH is subsequently lowered to pH 2.6 by means of 10% hydrochloric acid, the mixture is stirred for 15 minutes, and a solution of 121.5 g of $FeCl_3 \times 6\ H_2O$, 43.3 g of $TiCl_4$ and 10.6 g of $AlCl_3 \times 6\ H_2O$ in 77.0 g of demineralised water is metered in. The pH is kept constant at 2.6 by means of 32% sodium hydroxide solution. After this solution has been added, the mixture is stirred for a further approximately 15 minutes. The pH is subsequently raised to 7.5 by means of 32% sodium hydroxide solution, and 394 g of sodium water-glass solution (13.5% of $SiO_2$) are metered in at this pH. The pH is then lowered to 2.6 by means of 10% hydrochloric acid, the mixture is stirred for a further 15 minutes, and a solution of 135.0 g of $FeCl_3 \times 6\ H_2O$, 51.7 g of $TiCl_4$ and 11.0 g of $AlCl_3 \times 6\ H_2O$ in 87.2 g of demineralised water is metered in. The pH is kept constant at pH 2.6 by means of 32% sodium hydroxide solution. After this solution has been added, the mixture is stirred for a further 15 minutes. The pH is subsequently raised to pH 5.0 by means of 32% sodium hydroxide solution, and the mixture is stirred for a further 15 minutes. The pigment is filtered off, washed with demineralised water and dried at 110° C. for 16 hours. Finally, the pigment is ignited at 850° C. for 30 minutes, giving a slightly greenish gold pigment having an intense colour, high hiding power and strong lustre.

Example 2

100 g of mica having a particle size of 10–60 µm are heated to 75° C. in 2 l of demineralised water. When this temperature has been reached, the pH of the suspension is raised to pH 7.5 by means of 32% sodium hydroxide solution, and 163 g of sodium water-glass solution (13.5% of $SiO_2$) is metered in with vigorous stirring. During this, the pH is kept constant by means of 10% hydrochloric acid. The pH is subsequently lowered to pH 2.6 by means of 10% hydrochloric acid, the mixture is stirred for 15 minutes, and a solution of 188.0 g of $FeCl_3 \times 6\ H_2O$, 77.0 g of $TiCl_4$ and 16.7 g of $AlCl_3 \times 6\ H_2O$ in 121.4 g of demineralised water is metered in. The pH is kept constant at 2.6 by means of 32% sodium hydroxide solution. After this solution has been added, the mixture is stirred for a further approximately 15 minutes. The pH is subsequently raised to 7.5 by means of 32% sodium hydroxide solution, and 484.6 g of sodium water-glass solution (13.5% of $SiO_2$) are metered in at this pH at a rate of 2 ml/min. The pH is then lowered to 2.6 by means of 10% hydrochloric acid, the mixture is stirred for a further 15 minutes, and a solution of 188.0 g of $FeCl_3 \times 6\ H_2O$, 77.0 g of $TiCl_4$ and 16.7 g of $AlCl_3 \times 6\ H_2O$ in 121.4 g of demineralised water is metered in. The pH is kept constant at pH 2.6 by means of 32% sodium hydroxide solution. After this solution has been added, the mixture is stirred for a further 15 minutes. The pH is subsequently raised to pH 5.0 by means of 32% sodium hydroxide solution, and the mixture is stirred for a further 15 minutes. The pigment is filtered off, washed with 15 l of demineralised water and dried at 110° C. for 16 hours. Finally, the pigment is ignited at 850° C. for 30 minutes, giving an orange-red lustre pigment having an intense colour, high hiding power and strong lustre.

The following table shows the coloristic data of the pigments according to the invention compared with a pearlescent gold pigment and a gold-bronze pigment which correspond to the prior art (Hunter-Lab values, measured on a black background in specular reflection 22.5°/22.5°):

|  | L | a | b | h | C | Hiding power |
|---|---|---|---|---|---|---|
| Iriodin ® 306 gold-coloured pearlescent pigment ($TiO_2/Fe_2O_3$-coated mica pigment having a particle size of 10–60 µm from Merck KGaA) | 72.9 | 0.6 | 29.7 | 88.8 | 29.7 | 40.8 |
| Gold pigment Ex. 1 | 84.0 | −4.7 | 39.3 | 96.8 | 39.6 | 56.5 |
| Metal gold-bronze pigment (Eckart, rich bleach gold) | 78.2 | 0.9 | 22.7 | 87.7 | 22.7 | 51.8 |

The coloristic data clearly demonstrate the advantages over the comparative pigments, in particular in the b value and the chroma C.

Example 3

After-coating 200 g of gold pigment from Example 1 are heated to 75° C. in 1.8 l of demineralised water. When this temperature has been reached, the pH is set to pH 2.5 by means of 5% hydrochloric acid, and a solution of 11.5 g of $ZrOCl_2 \times 8\ H_2O$, 11.4 g of $NaH_2PO_4 \times H_2O$ and 10 ml of 37% hydrochloric acid in 856 g of demineralised water is metered in over the course of 60 minutes. During this, the pH is kept constant by means of 5% sodium hydroxide solution. After a post-stirring time of 30 minutes, the pH is raised to 9.2 by means of 5% sodium hydroxide solution. After stirring for a further 30 minutes, a solution of 4.1 g of Z6040 (organosiloxane; Dow Corning) in 200 ml of demineralised water is metered in over a period of 30 minutes, and the mixture is stirred for a further 30 minutes. The product is filtered off, washed and dried at 140° C. for 16 hours.

What is claimed is:

1. An interference pigment comprising a multicoated platelet-shaped substrate having at least one two layer sequence comprising:

(A) a colorless coating having a refractive index, n, of ≦1.8, and (B) a high-refractive-index coating consisting of a mixture of $TiO_2$ and $Fe_2O_3$ in a weight ratio of from 1:0.1 to 1:5, and one or more metal oxides selected from $Al_2O_3$, $Ce_2O_3$, $ZrO_2$, $SnO_2$ and/or $B_2O_3$, in an amount up to 20% by weight, based on the total weight of layer (B), and optionally (C) an outer protective layer.

2. An interference pigment according to claim 1, wherein the platelet-shaped substrate is natural or synthetic mica, glass platelets, $Al_2O_3$ platelets, $SiO_2$ platelets, $TiO_2$ platelets, or a metal oxide-coated, platelet-shaped material.

3. An interference pigment according to claim 1, wherein the colorless coating on the platelet-shaped substrate consists of $SiO_2$, $Al_2O_3$ AlO(OH), $B_2O_3$, $MgSiO_3$ or of a mixture of the said compounds.

4. An interference pigment according to claim 1, wherein layer (B) consists of pseudobrookite and the one or more metal oxides.

5. An interference pigment according to claim 1, wherein layer (A) essentially consists of one or more metal oxides.

6. An interference pigment according to claim 1, wherein layer (A) essentially consists of silicon dioxide, aluminium oxide, magnesium fluoride or mixtures thereof.

7. An interference pigment according to claim 1, wherein layer (B) comprises $Al_2O_3$, $Ce_2O_3$ and/or $B_2O_3$ as the further metal oxide.

8. An interference pigment according to claim 1, which has 1 to 4 pairs of the layer sequence (A)+(B).

9. An interference pigment comprising a multicoated platelet-shaped substrate having only one two layer sequence (A)+(B):

(A) a colorless coating having a refractive index, n, of ≦1.8, and (B) a high-refractive-index coating consisting of a mixture of $TiO_2$ and $Fe_2O_3$ in a weight ratio of from 1:0.1 to 1:5, and, optionally, one or more other metal oxides in an amount ≦20% by weight, based on the total weight of layer (B), and optionally (C) an outer protective layer.

10. An interference pigment according to claim 9, wherein at least one other metal oxide is present and is selected from $Al_2O_3$, $Ce_2O_3$, $ZrO_2$, $SnO_2$ and/or $B_2O_3$.

11. A process for preparing an interference pigment according to claim 5, which comprises applying the metal oxides of layers (A) and (B) to the platelet-shaped substrate by wet-chemical methods by hydrolytic decomposition of metal salts in aqueous medium.

12. A process for preparing an interference pigment according to claim 9, wherein layer (A) comprises one or more metal oxides, which comprises applying the metal oxides of layers (A) and (B) to the platelet-shaped substrate by wet-chemical methods by hydrolytic decomposition of metal salts in aqueous medium.

13. A paint, coating, printing ink, security ink, plastic, ceramic, glass or cosmetic composition comprising an interference pigment of claim 1.

14. A paint, coating, printing ink, security ink, plastic, ceramic, glass or cosmetic composition comprising an interference pigment of claim 9.

15. An interference pigment according to claim 1, wherein the platelet-shaped substrate is a phyllosilicate or metal oxide coated platelet-shaped material.

16. An interference pigment according to claim 1, wherein layer (A) has a thickness of 10–1000 nm and layer (B) has a thickness of 10–550 nm.

17. An interference pigment according to claim 1, wherein the total thickness of all layers on the substrate does not exceed 3 $\mu$m.

18. An interference pigment according to claim 1, wherein the pigment has two pairs of the sequence (A)+(B) on the substrate and optionally a further layer (C).

19. An interference pigment according to claim 1, wherein the pigment has two to four pairs of the sequence (A)+(B) on the substrate and optionally a further layer (C).

20. An interference pigment according to claim 1, wherein layer (B) has a refractive index of >2.0 and the mixture of $TiO_2$ and $Fe_2O_3$ in layer (B) has a weight ratio of from 1:1 to 1:2.5.

* * * * *

UNITED STATES PATENT AND TRADEMARK OFFICE
CERTIFICATE OF CORRECTION

PATENT NO. : 6,692,561 B1
DATED : February 17, 2004
INVENTOR(S) : Sabine Schoen et al.

It is certified that error appears in the above-identified patent and that said Letters Patent is hereby corrected as shown below:

Column 7,
Line 35, reads "$\leqq 1.8$" should read -- $\leq 1.8$ --
Line 39, reads "$\leqq 20\%$" should read -- $\leq 20\%$ --

Column 8,
Line 38, reads "> 2.0" should read -- $\geq 2.0$ --

Signed and Sealed this

Twenty-eighth Day of December, 2004

JON W. DUDAS
*Director of the United States Patent and Trademark Office*